March 24, 1953 — E. H. SANDERS — 2,632,269
ADVERTISING DEVICE
Filed Sept. 19, 1950
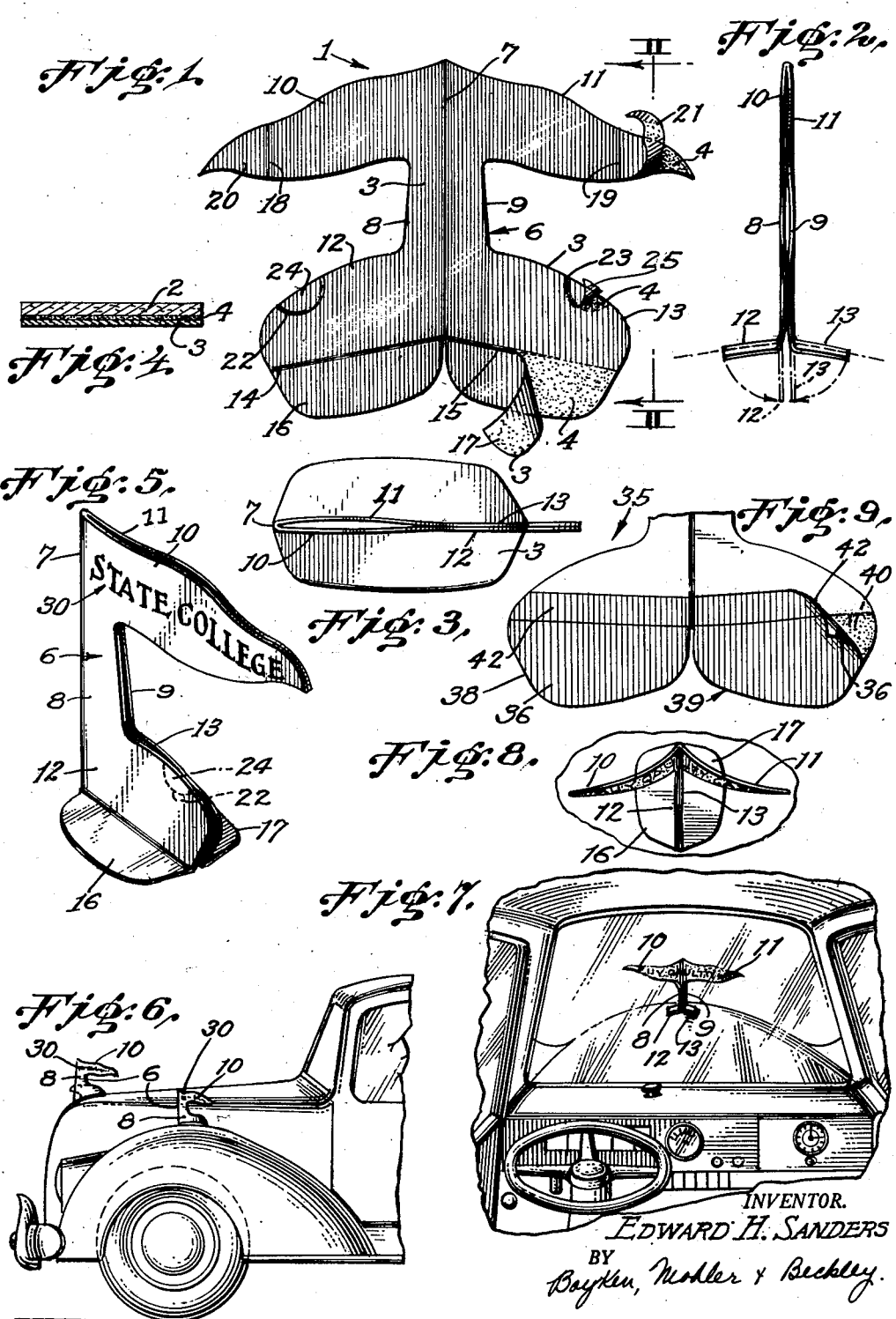
INVENTOR.
EDWARD H. SANDERS
BY Boyken, Mohler & Beckley.
ATTORNEYS.

Patented Mar. 24, 1953

2,632,269

UNITED STATES PATENT OFFICE 2,632,269

ADVERTISING DEVICE

Edward H. Sanders, San Francisco, Calif.

Application September 19, 1950, Serial No. 185,578

5 Claims. (Cl. 40—125)

This invention relates to advertising devices and more particularly to an advertising device adapted to be positioned on an automobile in a conspicuous location to attract attention.

From an advertising standpoint, the placing of stickers, plates and the like on automobiles is a very effective method of attracting attention. However, stickers and the like which are placed on various portions of a vehicle become a nuisance after a period of time unless readily removed. Furthermore, such stickers are not very effective inasmuch as they may be viewed only from a particular position.

The use of more permanent elements such as rigid metal plates is more desirable because such plates may be fastened to an automobile so that they extend outwardly from the body of the latter thus improving their visibility. However, such plates have the disadvantage of being relatively more expensive than stickers and such expense precludes the distribution of such devices gratuitously.

The main object of the present invention is the provision of an advertising device which may be positioned securely on an automobile as quickly as a seal or sticker and which is adapted to extend outwardly from the body of the automobile so as to be conspicuous.

Another object is the provision of an advertising device adapted to be releasably secured to an automobile and which device is less expensive to make than prior devices of like nature.

Still another object is the provision of an advertising device which is particularly adapted to be distributed gratuitously for disseminating advertising information.

Other objects and advantages will be seen in the following specification and the drawings.

In the drawings:

Fig. 1 is an elevational view of the one side of the blank from which the device is adapted to be formed.

Fig. 2 is a rear end elevational view of the device in folded position.

Fig. 3 is a top plan view of the device of Fig. 2.

Fig. 4 is a typical cross-sectional view through the blank of Fig. 1.

Fig. 5 is a perspective view of the device.

Fig. 6 is a side elevational view of the forward portion of an automobile showing two of the devices in use.

Fig. 7 is an elevational view of the forward portion of an automobile looking from inside the latter and showing the device in use.

Fig. 8 is a top plan view of the device in use with the flaps of the display element swung outwardly during movement of the automobile.

Fig. 9 is a fragmentary elevational view of a modified form of the blank of Fig. 1.

In detail, the device comprises a blank 1 cut from a sheet of semi-rigid material having a flexibility somewhat similar to that of relatively thin cardboard (Fig. 1).

This sheet of material preferably comprises a layer 2 of pressed paper or cardboard somewhat similar in texture to light weight "Bristol board." On one side of the layer 2 is another layer 3 of backing material and between said two layers is a layer 4 of pressure sensitive evertacky adhesive material. This adhesive material 4 may be provided on one side of the backing material 3 and then applied to the Bristol board 2 during the process of manufacturing the sheet material from which the blank is formed. However, it is necessary that the backing material of layer 3 is adapted to be peeled off the layer of Bristol board 2 leaving the evertacky material 3 exposed for a purpose to be described. Sheet material from which the blank 1 is formed is presently available and is commonly known by the names "Poston" or "Mystic."

The layer 2 is preferably a unitary layer of material and not formed from a plurality of plies so that there is no tendency for the adhesive to peel off layers of the base material during removal of the backing layer 3.

The blank 1 (Fig. 1) comprises a generally elongated portion 6 provided with a central longitudinally extending fold line 7 for folding said portion to form a pair of overlying sidewalls 8, 9 respectively (Fig. 5).

At the upper end of the portion 6 and extending oppositely outwardly from the sidewalls 8, 9 are a pair of corresponding elongated extensions 10, 11 respectively which are preferably pennant-shaped.

At the lower end of portion 6 are a pair of relatively wide extensions 12, 13 which extend oppositely outwardly from the sidewalls 8, 9 in a similar manner to the extensions 10, 11. These lower extensions 12, 13 are respectively provided with fold lines 14, 15 extending in directions generally transversely of the fold line 7 and providing a pair of flaps 16, 17 (Fig. 2). The fold lines 14, 15 are preferably formed by scoring the layer 3 of backing material so that the backing material 3 which is co-extensive with the area of flaps 16, 17 may be removed to expose the adhesive material 4 of said flaps (Fig. 1).

The extensions 10, 11 are also scored as at 18, 19 respectively adjacent the outer ends of said extensions so as to form tabs 20, 21 which may be removed to expose the adhesive material 4 (Fig. 1).

Similarly the lower extensions 12, 13 are scored as at 22, 23 respectively to form tabs 24, 25 which may be removed in like manner.

It will be apparent that the device of Fig. 5 may be achieved simply by folding the blank 1 of Fig. 1 along fold lines 7, 14 and 15. The tabs 20, 21 are correspondingly positioned so that when the same are removed, the extensions 10, 11 may be secured together at their outer ends by virtue of the pressure sensitive adhesive 4.

Similarly, the extensions 12, 13 which define a base for the portion 6 may be secured together by removing tabs 22, 23 before folding.

The flaps 16, 17 may be folded oppositely outwardly from the folded sidewalls 8, 9 and that portion of the backing layer 3 covering said flaps may be removed for releasably securing the device to a supporting surface of an automobile (Fig. 6).

The resulting structure, though formed of relatively light material is sufficiently rigid to stand upright on an automobile even at relatively high speeds. However, it will be noted that the resistance to bending under the influence of a wind moving in a direction transversely of the automobile is not great and the device will be swung towards a horizontal position under the influence of such a wind. This lateral flexibility of the device is important and desirable inasmuch as the area exposed to a laterally directed wind will be reduced upon deflection of the device from a vertical position.

As indicated in Fig. 5, indicia, generally designated 30, may be printed along the pennant-shaped extensions 10, 11. Such indicia 30 may be of a nature to indicate an affiliation with a group, team, college or the like.

If the device is to be distributed gratuitously, the remaining outer surfaces of the sidewalls 8, 9 and the extensions 12, 13 may contain advertising messages or symbols.

The present invention particularly lends itself to the type of advertising wherein gratuitous distribution of the device is contemplated. By eliminating any connection between the outer end of the extensions 10, 11, either by eliminating the tabs 20, 21 or by making their removal optional, advertising matter may be printed along the oppositely facing sides of said extensions. In such a case the effect of the wind moving past the device during movement of the automobile is to spread said extensions outwardly as indicated in Fig. 8. Thus, when the automobile is being driven, the advertising material contained on the normally oppositely facing sides of the pennant-shaped extensions 10, 11 will become visible to the occupants of the automobile (Fig. 7).

It will be apparent that the present invention is extremely inexpensive to manufacture inasmuch as it comprises only a planar sheet of material scored or folded as hereinbefore indicated. Thus, many such devices may be stacked within a relatively small space and cost of shipping is correspondingly reduced.

The folding and tab removing operations are extremely simple and the device may be fastened to an automobile in a matter of seconds.

In the event that the particular application of the device as shown in Figs. 7 and 8 is desired, a modified form of the device shown in Fig. 9 may be employed. The blank 35 of Fig. 9 is in all respects similar to that of Fig. 1 except that the layer of backing material 36 and pressure sensitive adhesive 40 is applied only to the flaps 38, 39 corresponding to the flaps 16, 17 of Fig. 1. This layer 36 of backing material may be provided with tab 42 respectively which is unsecured to the remainder of the device so as to provide a convenient means for grasping the backing layer for peeling it off.

When the blank is folded along the vertically extending fold line and the flaps 38, 39 swung oppositely outwardly and secured to a supporting surface of an automobile, the device will be similar in all respects to that shown in Fig. 5 except that the pennant-shaped extensions 10, 11 will be free for outward swinging to the position shown in Fig. 8.

Although this modified form may involve an additional operation in the manufacture of the blank it has the advantage of providing a simpler means for removing the layers of backing material and effects a savings in materials.

It is to be understood that the exact proportions shown on the drawings is not to be taken as restrictive of the invention as it is obvious that minor variations in design may be made without affecting the scope of the invention.

I claim:

1. An advertising device formed from a planar blank of semi-rigid sheet material which includes an elongated standard, a pair of corresponding similar pennant-shaped flaps extending oppositely outwardly of said standard at one end thereof, said blank being provided with a fold line along the central longitudinal axis of said standard for folding said blank to a position with said flaps in side by side closely adjoining relationship, a pair of complementarily formed fold lines adjacent the other end of said standard and extending in a direction generally transversely of said axis for forming a pair of flanges foldable oppositely outwardly of said standard to form a base therefor, said blank being formed with a pair of layers coextensive in area with an evertacky material between said layers, one of said layers being scored to provide tabs adapted to be removed to expose said evertacky material for adherently securing corresponding portions of said blank together when the latter is so folded and one of said layers being removable from said flanges to permit securing the device to a surface of an automobile by said evertacky material.

2. An advertising device formed from a planar blank of semi-rigid sheet material which includes an elongated standard, a pair of corresponding similar pennant-shaped flaps extending oppositely outwardly of said standard at one end thereof, said blank being provided with a fold line along the central longitudinal axis of said standard for folding said blank to a position with said flaps in side by side closely adjoining relationship, a pair of complementarily formed fold lines adjacent the other end of said standard and extending in a direction generally transversely of said axis for forming a pair of flanges foldable oppositely outwardly of said standard to form a base therefor, said blank being formed with a pair of layers coextensive in area with an evertacky material between said layers, one of said layers being scored to provide tabs adapted to be removed to expose said evertacky material for adherently securing corresponding portions of said blank together when the latter is so folded and one of said layers being removable from said flanges to permit securing the device to a surface of an automobile by said evertacky material, said tabs being positioned at corresponding points on said flaps respectively to permit direct engagement of the evertacky material at said points when the blank is so folded.

3. An advertising device formed from a planar blank of semi-rigid sheet material which includes an elongated standard having a base, a pair of corresponding similar pennant-shaped flaps extending oppositely outwardly of said standard at one end thereof, said blank being formed with a fold line along the central longitudinal axis of said standard for folding said blank from a position with said flaps coplanar to a position with the same in side by side closely adjoining relationship and a pair of complementarily formed fold lines adjacent said base and extending in a direction generally transversely of said axis for forming a pair of flanges foldable oppositely outwardly of said standard for securing said standard to the surface of an automobile, said blank being formed with a pair of layers coextensive in area with an evertacky material between said layers, one of said layers being scored to provide tabs adjacent said base and adapted to be removed to expose said evertacky material for adherently securing corresponding portions of said base together when the latter is so folded, said pennant-shaped flaps being free for swinging about said axis in a direction away from each other under the influence of air movement past the same whereby said flaps will spread apart to reveal the opposedly facing sides thereof when said standard is secured to an automobile and the latter is moving in a direction with said standard leading and said flaps trailing.

4. An advertising device formed from a planar blank of semi-rigid sheet material which includes an elongated standard having a base, a pair of corresponding similar pennant-shaped flaps extending oppositely outwardly of said standard at one end thereof, said blank being formed with a fold line along the central longitudinal axis of said standard for folding said blank from a position with said flaps coplanar to a position with the same in side by side closely adjoining relationship and a pair of complementarily formed fold lines adjacent said base and extending in a direction generally transversely of said axis for forming a pair of flanges foldable oppositely outwardly of said standard for securing said standard to the surface of an automobile.

5. An advertising device formed from a planar blank of semi-rigid sheet material which includes an elongated standard having a base, a pair of corresponding similar pennant-shaped flaps extending oppositely outwardly of said standard at one end thereof, said blank being formed with a fold line along the central longitudinal axis of said standard for folding said blank from a position with said flaps coplanar to a position with the same in side by side closely adjoining relationship and a pair of complementarily formed fold lines adjacent said base and extending in a direction generally transversely of said axis for forming a pair of flanges foldable oppositely outwardly of said standard for securing said standard to the surface of an automobile, said blank being formed in a plurality of coextensive layers with an evertacky material between one outer layer and the remainder of said blank whereby a portion of said outer layer may be removed at said flanges for adhering the latter to said surface by said evertacky material.

EDWARD H. SANDERS.

REFERENCES CITED

The following references are of record in the file of this patent:

UNITED STATES PATENTS

| Number | Name | Date |
|---|---|---|
| 1,330,142 | Schwartzberg | Feb. 10, 1920 |
| 1,567,195 | Rousseau | Dec. 29, 1925 |
| 1,592,196 | Ganz | July 13, 1926 |
| 2,032,561 | Buehler | Mar. 3, 1936 |
| 2,049,638 | Bennett | Aug. 4, 1936 |
| 2,082,859 | Walker | June 8, 1937 |
| 2,115,448 | Pradt | Apr. 26, 1938 |